(12) United States Patent
Flick

(10) Patent No.: US 6,722,008 B2
(45) Date of Patent: Apr. 20, 2004

(54) TOOL ASSEMBLY UNIT

(75) Inventor: Lee Flick, Macomb, MI (US)

(73) Assignee: T M Smith Tool International, Mount Clemens, MI (US)

( * ) Notice: Subject to any disclaimer, the term of this patent is extended or adjusted under 35 U.S.C. 154(b) by 35 days.

(21) Appl. No.: 10/047,674

(22) Filed: Jan. 14, 2002

(65) Prior Publication Data

US 2003/0041434 A1 Mar. 6, 2003

Related U.S. Application Data

(60) Provisional application No. 60/315,630, filed on Aug. 29, 2001.

(51) Int. Cl.[7] ............................................. B25B 27/14
(52) U.S. Cl. .................... 29/281.5; 29/281.1; 29/281.4; 29/281.6
(58) Field of Search .................. 29/407.05, 407.09, 29/281.1, 281.4, 281.5, 281.6; 483/18, 21; 82/1.11

(56) References Cited

U.S. PATENT DOCUMENTS

| 3,617,759 A | * | 11/1971 | Martin ........................ 356/620 |
| 5,140,739 A | * | 8/1992 | Yamaguchi et al. ........... 483/18 |
| 5,311,654 A | | 5/1994 | Cook ........................... 29/447 |
| 5,582,494 A | | 12/1996 | Cook ........................... 409/234 |
| 6,477,927 B1 | * | 11/2002 | Albo et al. .................. 82/1.11 |

OTHER PUBLICATIONS

Horizontal Tool Presetting System built by Briney Tool Holding Systems, 670 Soper Road, Bad Axe, Michigan 48413.

2 Station Horizontal Machine built by Briney Tool Holding Systems, 670 Soper Road, Bad Axe, Michigan 48413.

* cited by examiner

Primary Examiner—John C. Hong
(74) Attorney, Agent, or Firm—Howard & Howard

(57) ABSTRACT

The present invention provides a tool assembly unit for coupling a tool and a tool holder including a measuring device which determines the position of the tool with respect to the tool holder, an alignment device coupled to the measuring device which receives the tool holder, a moveable rod slideably disposed on the alignment device and coupled to the tool which moves the tool with respect to the tool holder to a desired position as measured by the measuring device. The tool may be affixed to the tool holder by heat shrinking.

17 Claims, 3 Drawing Sheets

TOOL ASSEMBLY UNIT

CROSS-REFERENCE TO RELATED APPLICATIONS

This application claims the benefit of U.S. Provisional Patent Application Serial No. 60/315,630, filed Aug. 29, 2001.

FIELD OF THE INVENTION

The present invention relates generally to heat shrink tools and more particularly to a device for accurate assembly of a tool to a tool holder by the heat shrink method.

BACKGROUND OF THE INVENTION

Connecting a tool to a tool holder by the heat shrink method is a well-known process. An example of the general process is described in U.S. Pat. No. 5,311,654 issued to Harold D. Cook on May 17, 1994. The heat shrink process is typically used with a tool holder having a bore for receipt of a tool having a shank. The tool holder is heated to expand the tool holder bore. The shank of the tool is then inserted into the bore. As the tool holder cools, the bore shrinks around the shank holding the shank within the tool holder.

The heat shrink method is an effective method for connecting a tool to a tool holder. However, in most applications, the tool must be precisely mounted within the tool holder or the tool holder cannot be used. It should be appreciated that these tools are typically used in operations that require very precise alignment and positioning. Slight variations in the alignment between tool and tool holder results in the production of defective parts. One of the major disadvantages of known methods for connecting a tool to a tool holder using the heat shrink method is the need to measure each tool and tool holder and the inaccuracy that can result from these repetitive measuring operations. Human error is a significant factor. A worker must measure the tool length and the tool holder length and then adjust the position of the tool to get the appropriate overall length. To reduce human error somewhat, another method employs a pre-qualified measuring rod to determine the appropriate depth of the tool within the tool holder. When this rod wears, the positioning is wrong and resultant tools and tool holders cannot be used. Furthermore, the heat shrink process must be done quickly to avoid down time when changing tools. If the heat shrink method is slow, tool changes will be slow resulting in the overall slowing of the entire operation in which the tool and tool holder are being used.

Accordingly, it would be advantageous to provide a tool assembly unit for rapidly and precisely connecting a tool to a tool holder.

SUMMARY OF THE INVENTION AND ADVANTAGES

It is an object of the present invention to provide a tool assembly unit for coupling a tool and a tool holder. The unit includes a measuring device adapted to determine the position of the tool with respect to the tool holder, an alignment device coupled to the measuring device and being adapted to receive the tool holder, a moveable rod slideably disposed on the alignment device and coupled to the tool, with the rod being adapted to move the tool with respect to the tool holder to a desired position as measured by the measuring device.

It is another object of the present invention to provide a tool assembly unit for coupling a tool and a tool holder by heat shrinking. The unit includes a measuring device adapted to determine the position of the tool with respect to the tool holder, an alignment device coupled to the measuring device and being adapted to receive the tool holder, a heating device slideably mounted on the alignment device and defining a bore for sliding a tool therethrough with the heating device adapted to be removably mounted on the tool holder for heating the tool holder, a moveable rod slideably disposed on the alignment device and being adapted to be coupled to the tool, with the rod being further adapted to move the tool with respect to the tool holder to a desired position as measured by the measuring device.

It is still another object of the present invention to provide a method for coupling a tool with a tool holder using a tool assembly unit including a measuring device coupled to an alignment device and a moveable rod slideably disposed on the alignment device. The method includes the steps of mounting the tool holder on the alignment device, coupling the moveable rod to the tool, measuring an actual relative position between the tool and tool holder, moving the tool within the tool holder until the actual relative position of the tool relative to the tool holder is equal to a desired position, and removing the tool holder and the tool from the alignment device.

It is still another object of the present invention to provide a method for coupling a tool with a tool holder by heat shrinking using a tool assembly unit including a measuring device coupled to an alignment device having a heating device slideably mounted thereon and a moveable rod slideably disposed on the alignment device. The method includes the steps of mounting the tool holder on the alignment device, heating the tool holder, coupling the moveable rod to the tool, measuring an actual relative position between the tool and the tool holder, moving the tool within the tool holder until the actual position of the tool relative to the tool holder is equal to a desired position, shrinking the tool holder around the tool, and removing the tool holder and the tool from the alignment device.

The subject invention provides many advantages over conventional tool assembly units by providing a tool assembly unit that rapidly and precisely couples a tool and a tool holder. One of the major advantages is reducing or eliminating the need to measure each tool and tool holder, thereby significantly reducing the inaccuracy that can result from these repetitive measuring operations due to human error. Another advantage is that rod wear does not result in improper positioning of the tool relative to the tool holder, thereby reducing cost by reducing the number of resultant tool assembly units that cannot be used. Furthermore, the tool assembly unit of the present invention permits the heat shrink process to be done quickly to avoid down time when changing tools, thus reducing tool change time and encouraging an efficient assembly operation.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
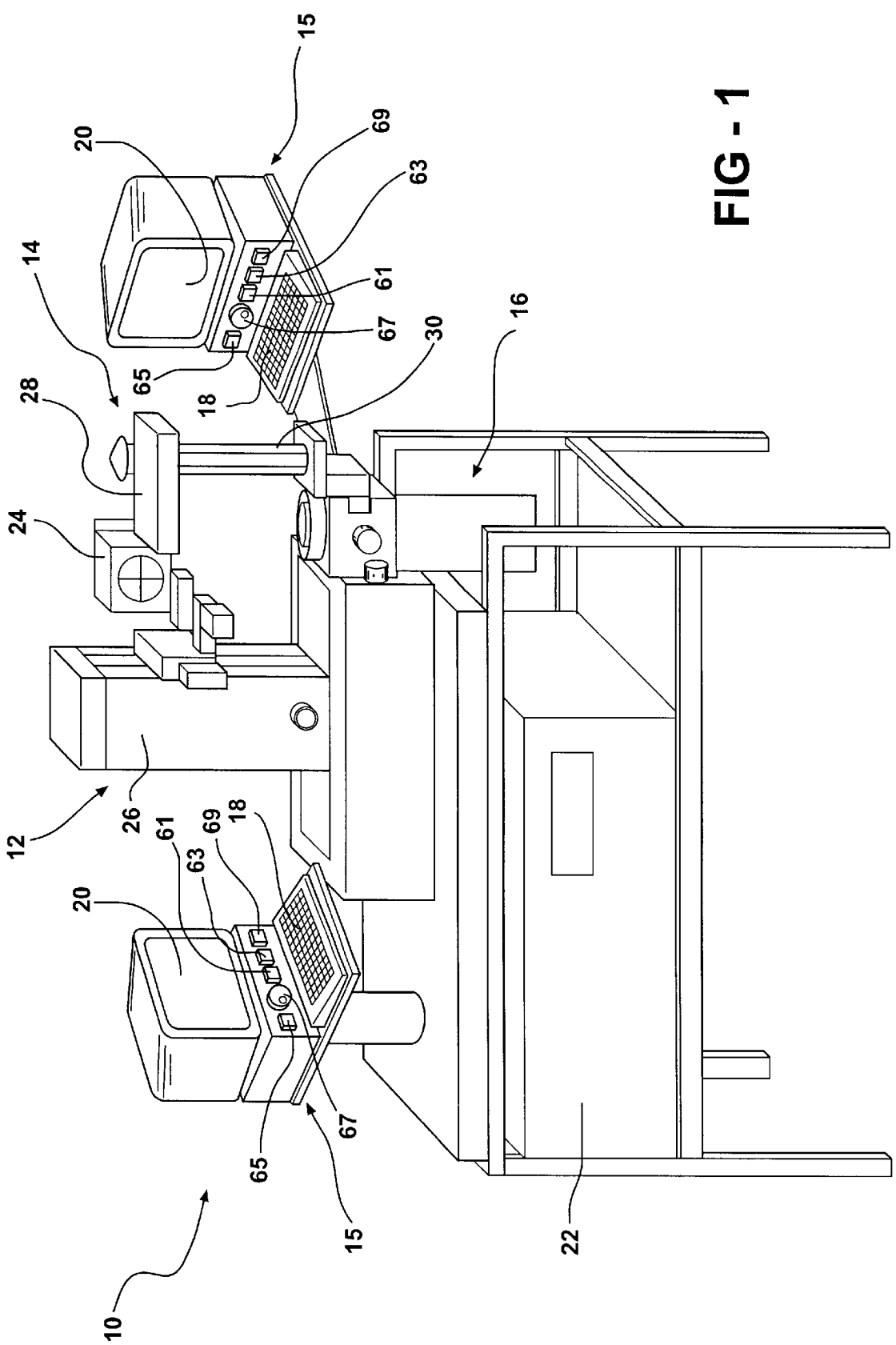
FIG. 1 is a perspective view of a tool assembly unit.

Referring to the Figures, wherein like numerals indicate like or corresponding parts throughout the several views, a tool assembly unit is generally shown at 10. The tool assembly unit 10 includes a measuring device shown generally at 12, a heating device shown generally at 14, and an alignment device shown generally at 16. A controller 15 controls the various operations of the tool assembly unit 10. The controller 15 includes a control panel 18 and a display screen 20. In the disclosed embodiment, a work table 22 is also shown for supporting the tool assembly unit 10.

The measuring device 12 is a standard tool measuring device such as, for example, a microset unit sold by Tooling Systems Division of Frankenmuth, Mich. The measuring device 12 includes an optical viewer 24 mounted on a vertical tower 26. The optical viewer 24 in the disclosed embodiment is connected to the controller 15. In use, the desired length of the assembled tool and tool holder is inputted into the controller 15 which automatically adjusts the optical viewer 24 to the correct height along the tower 26. In operation, once the tool 36 is correctly positioned with respect to viewer 24, the correct height is known for that particular desired tool and tool holder assembly.

In another embodiment, the optical viewer 24 is adapted for continuously determining the position of the tool 36 with respect to the tool holder 34. In addition, the controller 15 may be connected to the viewer 24 and the tool 36 and tool holder 34 such that the optical viewer 24 continuously detects the actual position of the tool 36 with respect to the tool holder 34 and sends an electronic signal to the controller 15 indicating the actual position. In response, the controller 15 compares the actual position with the desired position and moves the tool 36 with respect to the tool holder 34 until the desired position is achieved.

The heating device 14 includes a heater 28 mounted on a slide tower 30. The position and operation of the heater 28 is controlled by the controller 15. Although two controllers 15 have been disclosed, it will be appreciated by those of ordinary skill in the art that a single controller or any other type of control unit could be used to perform the operation and positioning of the heater 28 and optical viewer 24.

Figure 2:
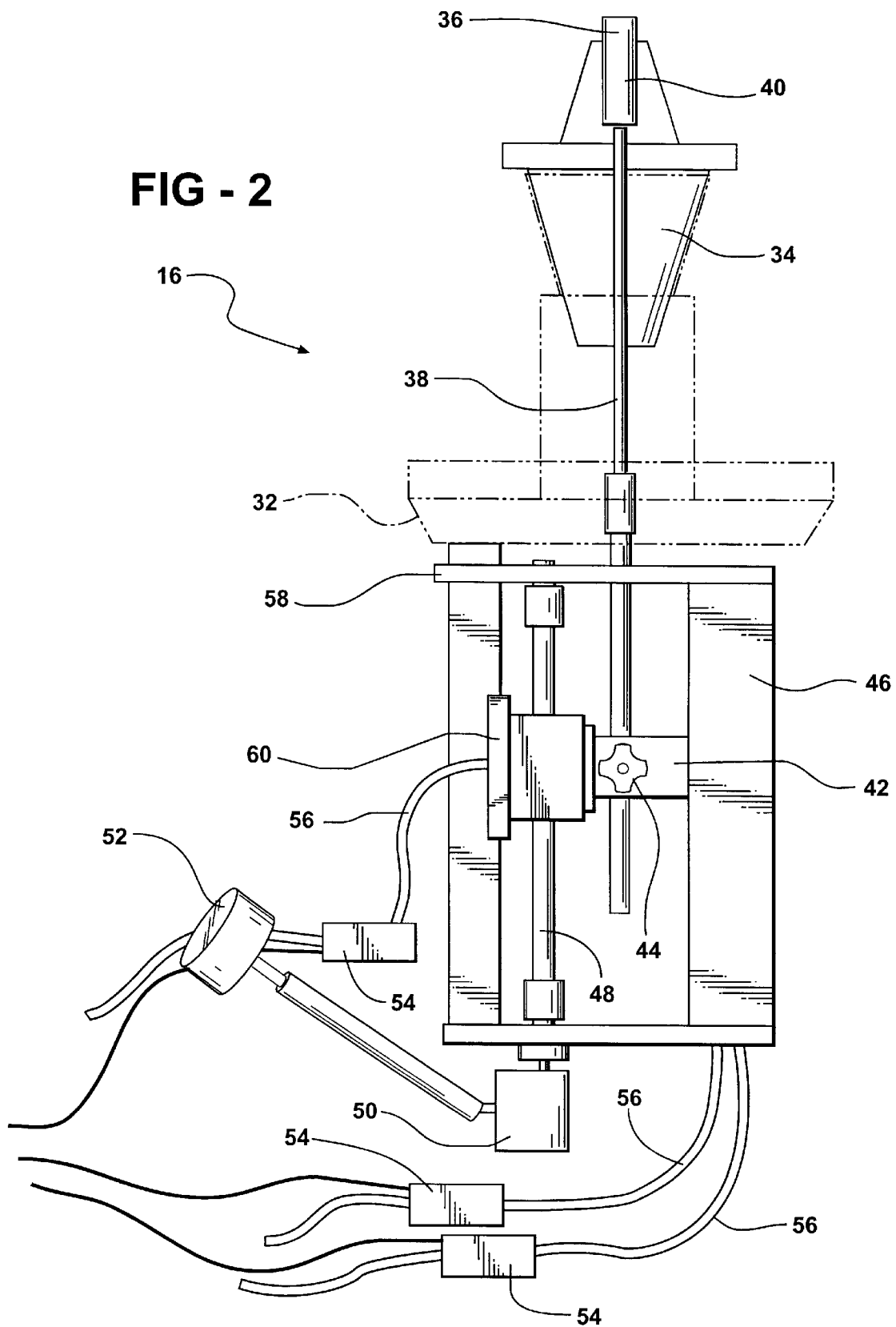
FIG. 2 is a perspective view of an alignment device used in the tool assembly unit of FIG. 1.

With reference to FIG. 2, the alignment device 16 will be described. The alignment device 16 includes a spindle 32 for holding the tool holder 34. In the preferred embodiment, the tool holder 34 is held within the spindle 32 through a vacuum clamp. The tool to be mounted within the tool holder 34 is shown generally at 36. A push rod 38 is adapted to reciprocate through the spindle 32 and tool holder 34 to engage the shank 40 of the tool 36. The engagement of the rod 38 with the shank 40 may be such that they are removably attached, coupled so that the tool 36 rests on top of the rod 38 or any other suitable means of coupling or mating such that the rod 38 may move the tool 36 within the tool holder 34 to the desired position.

The rod 38 is removably mounted to an adjustable mount 42. In the disclosed embodiment, the rod 38 is mounted to the mount 42 through an adjustable screw 44. The rod 38 is removably mounted so that different rod sizes can be used or the rod 38 can be replaced if it becomes worn. However, it should be appreciated that wear of the rod is not important to the proper operation of the present invention since the rod itself is only used as a push rod for positioning the tool 36 with respect to the tool holder 34 and the viewer 24. This operation will be described in greater detail below.

The mount 42 is connected to an adjustment device comprising an air slide 46 and an adjustment shaft 48. In the preferred embodiment, the air slide 46 provides for rapid adjustment and the shaft 48 provides for fine adjustment. The fine adjustment in the disclosed embodiment is achieved through a gear box 50 and an electronic control 52. System air is controlled through electronic controls 54 which control pressurized air through air lines 56. The electronic controls 52, 54 are coupled to the controller 15.

A housing top surface is shown at 58 and a mounting bracket is shown at 60. The top surface 58 and the mounting bracket 60 form the support for supporting the alignment device 16 with respect to the heating device 14 and measuring device 12.

Figure 3:
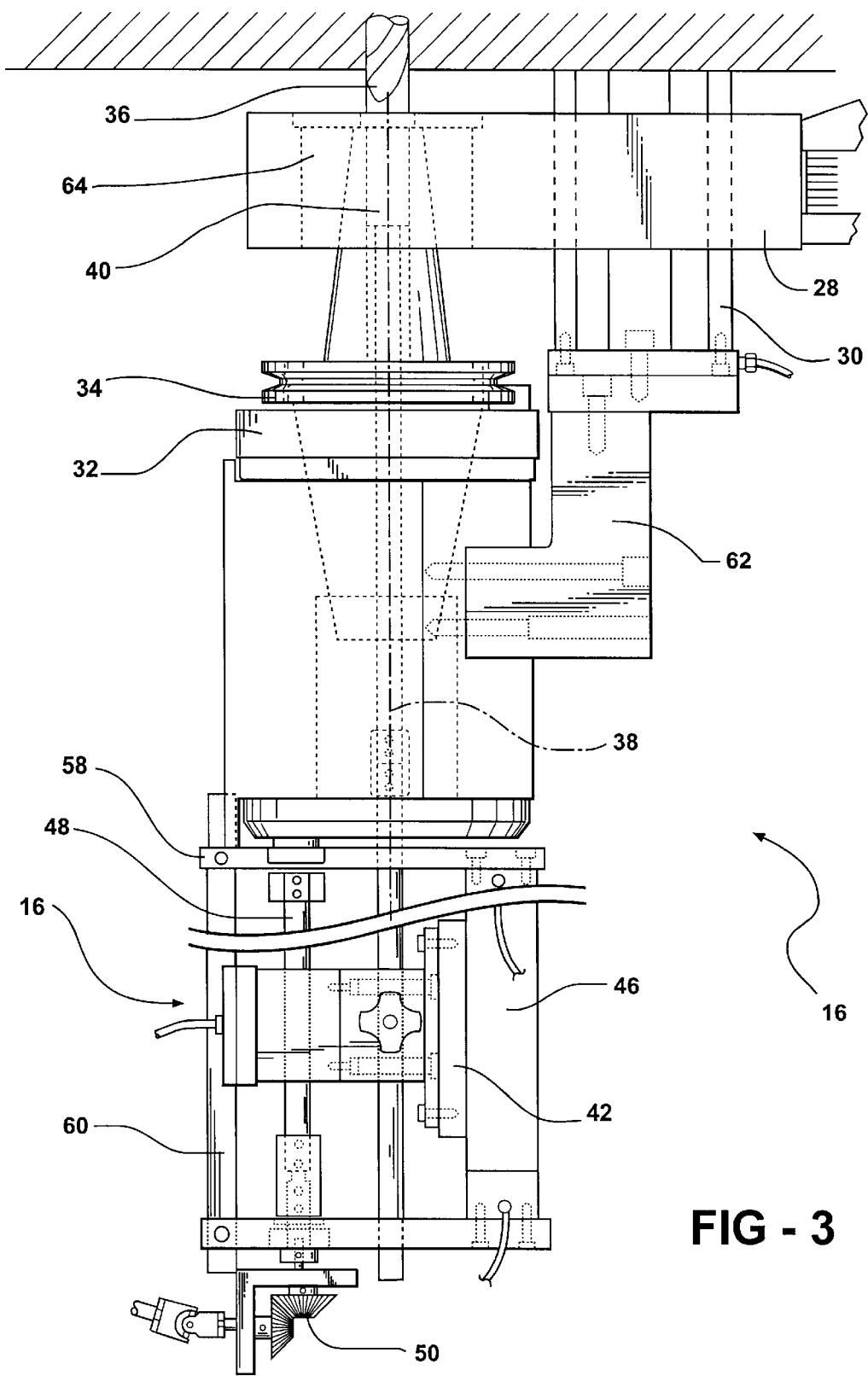
FIG. 3 is an elevational view of the alignment device of FIG. 2.

With reference to FIG. 3, the operation of unit 10 will be described. In operation, the push rod 38 is initially moved to its lowest position. In this position, the push rod 38 can be replaced if necessary. As discussed above, replacement of the push rod may be required if there has been damage to the push rod or undue wear or if a different size push rod is required for a specific mounting operation. The control panel 18 for controlling the push rod 38 is illustrated schematically. The down button 61 would be engaged to move the push rod 38 down.

After the push rod 38 is down, the tool holder 34 is then placed in the spindle 32. The vacuum clamp is energized by pushing button 63 on the control panel 18. This holds the tool holder 34 within the spindle 32. It is contemplated that a standard vacuum clamp would be employed or any other suitable means of retaining the tool holder 34 within the spindle 32.

At this point in the operation, if there is an existing tool 36 mounted within the tool holder 34, i.e., the intent is to replace the tool 36, the push rod 38 would be raised to touch the bottom of the cutting tool 36. This would be controlled by a push rod up button 65. Then either manual measurement of the tool 36 and tool holder 34 would be done or the measuring device 12 would be set at the predetermined dimension for the tool 36 and tool holder 34.

The heating unit 14 would then be programmed through the controller 15 which in this embodiment is being shown with the same numeric indication as the push rod controller 15 and vacuum control. Again, as indicated above, these various controllers could be a single unit or various units to control the various operations of unit 10. The controller 15 would initiate heating of the heater 28 and also move the heater 28 into position so that the bore 64 in the heater is positioned over the bore of the tool holder 34 to heat that region and expand it for receipt of the shank 40 of tool 36.

As illustrated in FIG. 3, the heater slide 30 is mounted through bracket 62 to the spindle 32 of the alignment device 16. Once the tool holder 34 is properly heated, the heating device 28 will move away from the tool holder 34 and either the existing tool 36 can be removed and a new tool inserted into the bore. Or if it is a first time assembly, a new tool is inserted. A fine adjustment knob 67 is then used to raise or lower the tool 36 to the crosshairs of the optical viewer 24. Once the tool 36 is properly within the crosshairs of optical viewer 24, the proper alignment between tool 36 and tool holder 34 has been achieved. The vacuum clamp is then released by pushing vacuum clamp button 63 and the tool holder 36 and tool 34 are removed from the spindle 32 and placed into a cooling rack for complete cooling.

The foregoing detailed description shows the preferred embodiments of the present invention are well suited to fulfill the objects of the invention. It is recognized that those skilled in the art may make various modifications or additions to the preferred embodiments chosen herein to illustrate the present invention, without departing from the spirit of the present invention. Accordingly, it is to be understood that the subject matter sought to be afforded protection should be deemed to extend to the subject matter defined in the appended claims, including all equivalents thereof.

The invention has been described in an illustrative manner, and it is to be understood that the terminology that has been used is intended to be in the nature of words of description rather than limitation. It will be apparent to those skilled in the art that many modifications and variations of the present invention are possible in light of the above teachings. Therefore, it is to be understood that the invention may be practiced otherwise than as specifically described within the scope of the amended claims.

What is claimed is:

1. A tool assembly unit for coupling a tool and a tool holder, said unit comprising:

a measuring device for determining a position of the tool with respect to the tool holder and establishing a desired position of the tool with respect to the tool holder;

an alignment device adjacent to said measuring device for receiving the tool holder and including a moveable rod for engaging the tool; and an adjustment device coupled to said moveable rod for moving said moveable rod to move the tool with respect to the tool holder to the desired position.

2. A tool assembly unit as set forth in claim 1 wherein said alignment device defines an aperture for slideably disposing said moveable rod therein.

3. A tool assembly unit as set forth in claim 1 wherein said measuring device includes an optical viewer disposed thereon for determining a position of the tool with respect to the tool holder.

4. A tool assembly as set forth in claim 3 including a controller coupled to said optical viewer and said alignment device for controlling said moveable rod in response to input by a user.

5. A tool assembly as set forth in claim 3 including a controller coupled to said optical viewer and said alignment device for controlling said moveable rod in response to feedback from said optical viewer.

6. A tool assembly unit as set forth in claim 1 including a controller coupled to said measuring device and said alignment device for controlling each of said devices.

7. A tool assembly unit as set forth in claim 1 including a work table having said measuring device being mounted thereon.

8. A tool assembly unit as set forth in claim 1 further including a mount having an adjustable screw for removeably mounting said moveable rod therewith.

9. A tool assembly unit as set forth in claim 1 wherein said adjustment device comprises an air slide and an adjustment shaft.

10. A tool assembly unit for coupling a tool and a tool holder by heat shrinking, said unit comprising:

a measuring device for determining a position of the tool with respect to the tool holder and establishing a desired position of the tool with respect to the tool holder;

an alignment device adjacent to said measuring device for receiving the tool holder and including a moveable rod for engaging the tool;

a heating device slideably mounted on said alignment device for heating the tool holder to facilitate coupling of the tool therewith; and an adjustment device coupled to said moveable rod for moving said moveable rod to move the tool with respect to the tool holder to the desired position after said heating device has heated the tool holder.

11. A tool assembly unit as set forth in claim 10 wherein said alignment device defines an aperture for slideably disposing said moveable rod therein.

12. A tool assembly unit as set forth in claim 10 wherein said measuring device includes an optical viewer disposed thereon for determining a position of the tool with respect to the tool holder.

13. A tool assembly as set forth in claim 12 including a controller coupled to said optical viewer and said alignment device for controlling said moveable rod in response to feedback input by a user.

14. A tool assembly as set forth in claim 12 including a controller coupled to said optical viewer and said alignment device for controlling said moveable rod in response to feedback from said optical viewer.

15. A tool assembly unit as set forth in claim 10 including a controller coupled to said measuring device, said alignment device, and said heating device for controlling each of said devices.

16. A tool assembly unit as set forth in claim 10 including a work table having said measuring device being mounted thereon.

17. A tool assembly unit for coupling a tool and a tool holder by heat shrinking, said unit comprising:

a measuring device including an optical viewer for determining a position of the tool with respect to the tool holder and establishing a desired position of the tool with respect to the tool holder;

an alignment device adjacent to said measuring device and defining an aperture for receiving the tool holder;

a heating device slideably mounted on said alignment device for heating the tool holder to facilitate coupling of the tool therewith;

a moveable rod slideably disposed within said aperture of said alignment device for engaging the tool;

an adjustment device coupled to said moveable rod and including an air slide and an adjustment shaft for moving said moveable rod to move the tool with respect to the tool holder to the desired position after said heating device has heated the tool holder; and a controller programmed for controlling said adjustment device to control a position of said moveable rod to vary the position of the tool with respect to the tool holder until the tool is in the desired position with respect to the tool holder.

* * * * *